United States Patent
Sodagar

(10) Patent No.: US 11,451,602 B2
(45) Date of Patent: Sep. 20, 2022

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/477,315

(22) Filed: Sep. 16, 2021

(65) Prior Publication Data

US 2022/0217190 A1 Jul. 7, 2022

Related U.S. Application Data

(60) Provisional application No. 63/134,520, filed on Jan. 6, 2021.

(51) Int. Cl.
| | | |
|---|---|---|
| *H04L 65/61* | (2022.01) | |
| *H04L 67/146* | (2022.01) | |
| *H04L 67/02* | (2022.01) | |
| *H04N 21/84* | (2011.01) | |
| *H04N 21/435* | (2011.01) | |

(52) U.S. Cl.
CPC .............. *H04L 65/61* (2022.05); *H04L 67/02* (2013.01); *H04L 67/146* (2013.01); *H04N 21/435* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 9,646,162 | B2 * | 5/2017 | Giladi | ............... H04L 67/02 |
| 2014/0013375 | A1 * | 1/2014 | Giladi | ............... H04L 67/02 |
| | | | | 725/112 |
| 2014/0115037 | A1 * | 4/2014 | Liu | ............... H04L 65/1016 |
| | | | | 709/203 |
| 2016/0261665 | A1 * | 9/2016 | Stockhammer | ......... H04L 67/02 |
| 2017/0104803 | A1 * | 4/2017 | Giladi | ............... H04L 67/306 |

(Continued)

OTHER PUBLICATIONS

"Information technology—Dynamic adaptive streaming over HTTP (DASH)—Part 8: Session-based DASH operations," N19641, ISO/IEC, Jul. 10, 2020 (27 pages).

*Primary Examiner* — Lashonda Jacobs-Burton
(74) *Attorney, Agent, or Firm* — ArentFox Schiff LLP

(57) ABSTRACT

Aspects of the disclosure include methods, apparatuses, and non-transitory computer-readable storage mediums for receiving media data. One apparatus includes processing circuitry that receives a media presentation description (MPD) file that includes an essential property descriptor for session-based dynamic adaptive streaming over hypertext transfer protocol (DASH) operation. The essential property descriptor indicates a session-based description (SBD) file that includes one or more key-value pairs dynamically generated by a local SBD session controller. Each key of the one or more key-value pairs indicates service information of a different service of a local device. The processing circuitry modifies a uniform resource locator (URL) based on the SBD file. The processing circuitry acquires a resource from a remote server based on the modified URL.

20 Claims, 6 Drawing Sheets

(56) References Cited

U.S. PATENT DOCUMENTS

| | | | |
|---|---|---|---|
| 2017/0180565 A1* | 6/2017 | Chowdhury | H04L 12/1407 |
| 2018/0191587 A1* | 7/2018 | Chen | H04L 65/65 |
| 2019/0281100 A1* | 9/2019 | Lo | H04N 21/8173 |
| 2020/0351567 A1* | 11/2020 | Liu | H04N 21/23439 |
| 2021/0021880 A1* | 1/2021 | Katsumata | H04N 21/4394 |

\* cited by examiner

METHODS AND APPARATUSES FOR DYNAMIC ADAPTIVE STREAMING OVER HTTP

INCORPORATION BY REFERENCE

This present application claims the benefit of priority to U.S. Provisional Application No. 63/134,520, "DYNAMIC SEGMENT URI QUERY CREATION BASED ON DEVICE DATA USING DASH SESSION-BASED OPERATIONS STANDARD," filed on Jan. 6, 2021, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) provides a standard for streaming multimedia content over Internet Protocol (IP) networks. The standard is referred to as dynamic adaptive streaming over hypertext transfer protocol (DASH) standard. The DASH standard includes a part for session-based DASH operation. In the session-based DASH operation, while a media presentation file (MPD) is generic for all clients, a client can get a side file, which can provide instructions for the client to make the MPD file specific for a session of the client. The side file is referred to as a session-based description (SBD) file.

SUMMARY

Aspects of the disclosure provide apparatuses for receiving media data. One apparatus includes processing circuitry that receives a media presentation description (MPD) file that includes an essential property descriptor for session-based dynamic adaptive streaming over hypertext transfer protocol (DASH) operation. The essential property descriptor indicates a session-based description (SBD) file that includes one or more key-value pairs dynamically generated by a local SBD session controller. Each key of the one or more key-value pairs indicates service information of a different service of a local device. The processing circuitry modifies a uniform resource locator (URL) based on the SBD file. The processing circuitry acquires a resource from a remote server based on the modified URL.

In an embodiment, the essential property descriptor includes a local address of the SBD file.

In an embodiment, the service information includes at least one of device information, user information, application information, or location information.

In an embodiment, in response to a change in the service information of the local device, the processing circuitry updates one of the one or more key-value pairs corresponding to the service information of one of the services of the local device.

In an embodiment, the processing circuitry modifies at least one of a host part, a port part, a path part, or a fragment part of the URL based on the SBD file.

In an embodiment, the processing circuitry adds a query to the URL based on the SBD file.

In an embodiment, the URL is one of a media segment request, an MPD request, an extensible markup language linking language (XLink) resolution request, a callback request that is triggered by a callback event, a chaining request for a chained-to MPD, or a fallback request for a fallback MPD.

In an embodiment, a type of the SBD file is a dynamic type and the one or more key-value pairs are arranged in a time-based order.

Aspects of the disclosure provide methods for receiving media data. The methods can include one or a combination of steps performed by the apparatuses. In one method, an MPD file is received. The MPD file includes an essential property descriptor for session-based DASH operation. The essential property descriptor indicates an SBD file that includes one or more key-value pairs dynamically generated by a local SBD session controller. Each key of the one or more key-value pairs indicates service information of a different service of a local device. A URL is modified based on the SBD file. A resource is acquired from a remote server based on the modified URL.

Aspects of the disclosure also provide non-transitory computer-readable mediums storing instructions which, when executed by a computer for receiving media data, cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
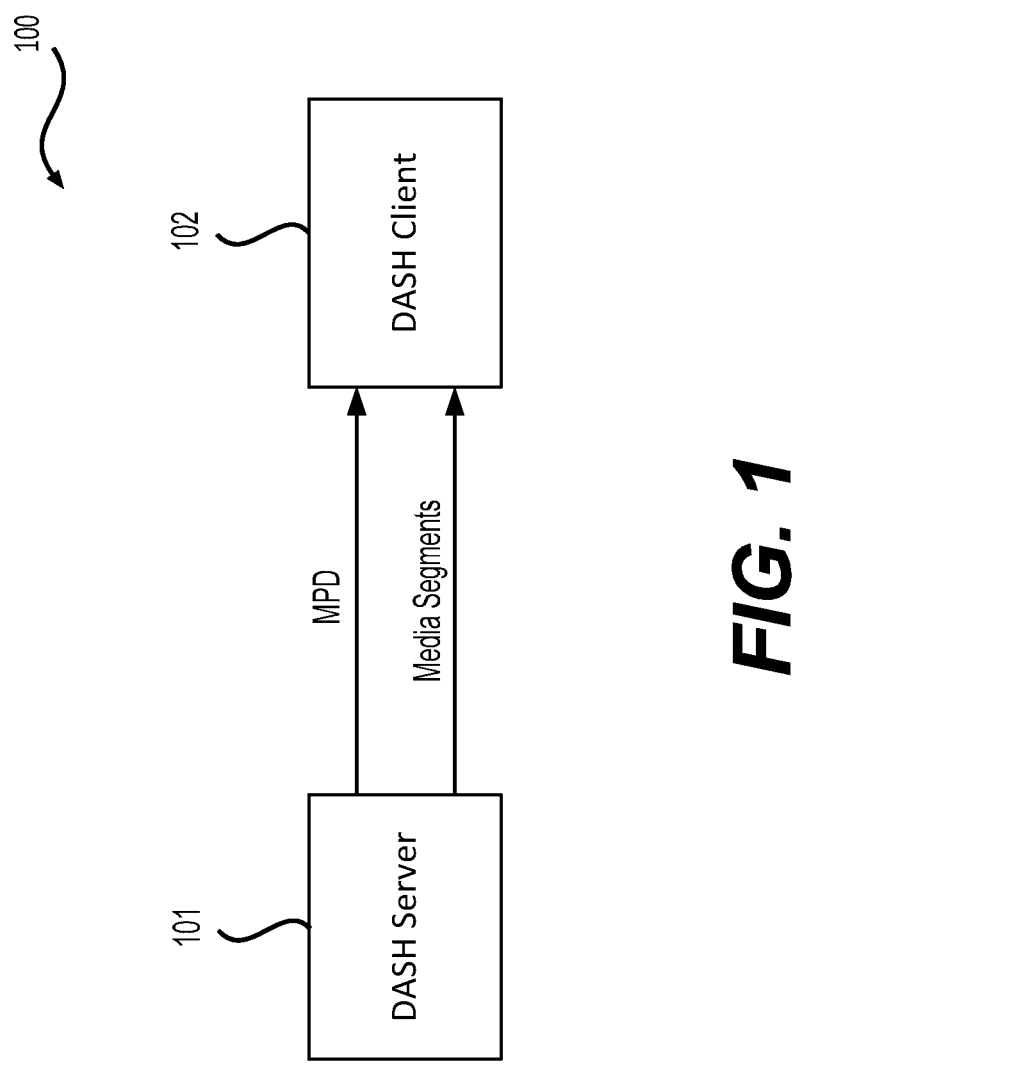
FIG. 1 shows an exemplary dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can also be updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client. However, in some related examples, the session-based DASH operation is application-specific. That is, for each new application, a new SBD format is required.

This disclosure includes methods for customizing or modifying a URL in a session-based DASH.

FIG. 1 shows an exemplary DASH system (100) according to an embodiment of the disclosure. In the DASH system (100), an MPD file is sent from a DASH server (101) (e.g., a content server) to a DASH client (102). The DASH client (102) can receive media segments from a server, such as the DASH server (101), based on the MPD file. The DASH client (102) can send a request to the DASH server (101) for updating the MPD file. The DASH server (101) can provide a content stream, including primary content (e.g., a main program) and one or more timed metadata tracks. In addition, the DASH client (102) can receive an SBD file from a server, such as the DASH server (101) or a third party (e.g., session controller).

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
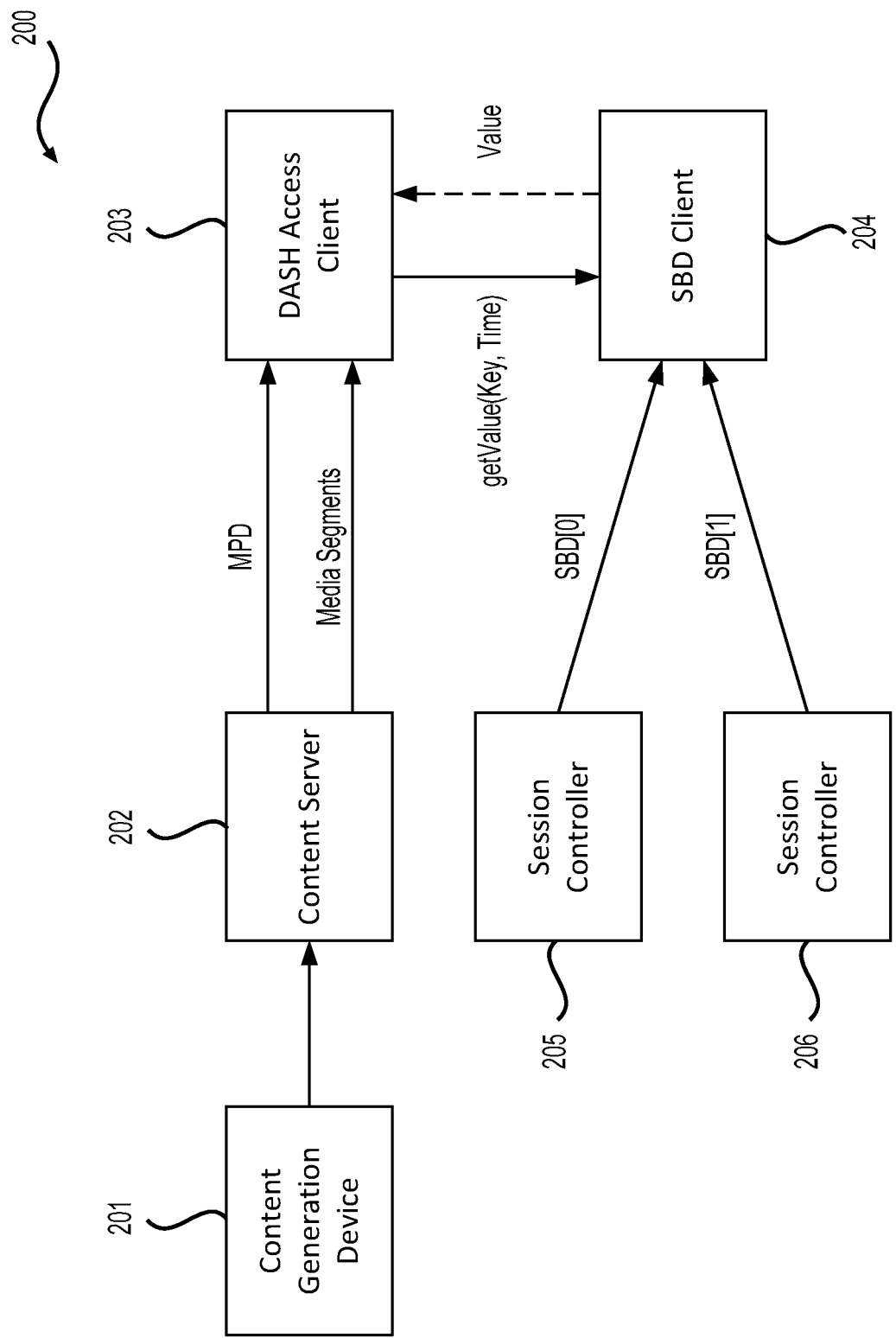
FIG. 2 shows an exemplary session-based DASH system according to an embodiment of the disclosure.

FIG. 2 shows another exemplary session-based DASH operation architecture 200 according to an embodiment of the disclosure. In the session-based DASH operation architecture 200, multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) to access an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

According to aspects of the disclosure, in order to link multiple SBDs to an MPD, one or more essential property descriptors for session-based DASH can be used at an MPD level and each essential property descriptor for session-based DASH includes similar or same essential property descriptor attributes. Note that presentation descriptor can be either an essential property descriptor or a supplemental property descriptor. For an essential property, the media presentation author expresses that the successful processing of the descriptor is essential to properly use the information in the parent element that contains this descriptor unless the element shares the same @id with another EssentialProperty element. By contrast, for a supplemental property, the media presentation author expresses that the descriptor contains supplemental information that may be used by the DASH Client for optimized processing.

Figure 3:
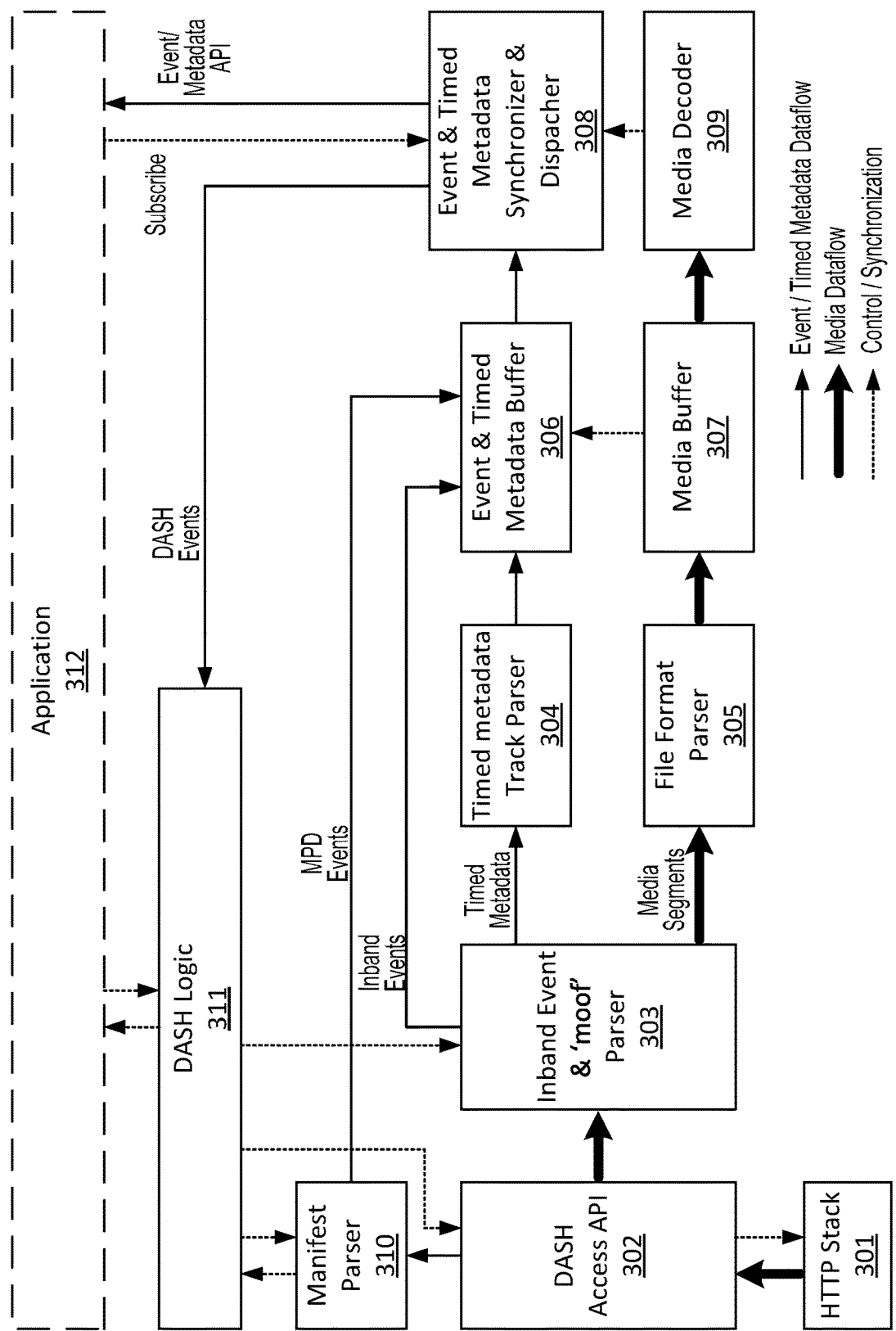
FIG. 3 shows an exemplary DASH client architecture according to an embodiment of the disclosure.

FIG. 3 shows an exemplary DASH client architecture according to an embodiment of the disclosure. The DASH client (or DASH player) can be configured to communicate with an application (312) and process various types of events, including (i) MPD events, (ii) inband events, and (iii) timed metadata events.

A manifest parser (310) can parse a manifest (e.g., an MPD). The manifest can be provided by the DASH server (101) for example. The manifest parser (310) can extract event information about MPD events, inband events, and timed metadata events embedded in timed metadata tracks. The extracted event information can be provided to a DASH logic (311) (e.g., DASH player control, selection, and heuristic logic). The DASH logic (311) can notify the application (312) of event schemes signaled in the manifest based on the event information.

The event information can include event scheme information for distinguishing between different event streams. The application (312) can use the event scheme information to subscribe to event schemes of interest. The application (312) can further indicate a desired dispatch mode for each of the subscribed schemes through one or more subscription application programming interfaces (APIs). For example, the application (312) can send a subscription request to the DASH client that identifies one or more event schemes of interest and any desired corresponding dispatch modes.

If the application (312) subscribes to one or more event schemes that are delivered as part of one or more timed metadata tracks, an inband event and 'mod' parser (303) can stream the one or more timed metadata tracks to a timed metadata track parser (304). For example, the inband event and 'moof' parser (303) parses a movie fragment box ("moot") and subsequently parses the timed metadata track based on control information from the DASH logic (311).

The timed metadata track parser (304) can extract event messages embedded in the timed metadata track. The extracted event messages can be stored in an event and timed metadata buffer (306). A synchronizer/dispatcher module (308) (e.g., event and timed metadata synchronizer and dispatcher) can dispatch (or send) the subscribed events to the application (312).

MPD events described in the MPD can be parsed by the manifest parser (310) and stored in the event and timed metadata buffer (306). For example, the manifest parser (310) parses each event stream element of the MPD, and parses each event described in each event stream element. For each event signaled in the MPD, event information such as presentation time and event duration can be stored in the event and timed metadata buffer (306) in association with the event.

The inband event and 'moof' parser (303) can parse media segments to extract inband event messages. Any such identified inband events and associated presentation times and durations can be stored in the event and timed metadata buffer (306).

Accordingly, the event and timed metadata buffer (306) can store therein MPD events, inband events, and/or timed metadata events. The event and timed metadata buffer (306) can be a First-In-First-Out (FIFO) buffer, for example. The event and timed metadata buffer (306) can be managed in correspondence with a media buffer (307). For example, as long as a media segment exists in the media buffer (307), any events or timed metadata corresponding to that media segment can be stored in the event and timed metadata buffer (306).

A DASH Access API (302) can manage the fetching and reception of a content stream (or dataflow) including media content and various metadata through an HTTP protocol stack (201). The DASH Access API (302) can separate the received content stream into different dataflows. The dataflow provided to the inband event and 'moof' parser (303) can include media segments, one or more timed metadata tracks, and inband event signaling included in the media segments. In an embodiment, the dataflow provided to the manifest parser (310) can include an MPD.

The DASH Access API (302) can forward the manifest to the manifest parser (310). Beyond describing events, the manifest can also provide information on media segments to the DASH logic (311), which can communicate with the application (312) and the inband event and 'moof' parser (303). The application (312) can be associated with the media content processed by the DASH client. Control/synchronization signals exchanged among the application (312), the DASH logic (311), the manifest parser (310), and the DASH Access API (302) can control the fetching of media segments from the HTTP Stack (201) based on information regarding media segments provided in the manifest.

The inband event and 'moof' parser (303) can parse a media dataflow into media segments including media content, timed metadata in a timed metadata track, and any signaled inband events in the media segments. The media segments including media content can be parsed by a file format parser (305) and stored in the media buffer (307).

The events stored in the event and timed metadata buffer (306) can allow the synchronizer/dispatcher (308) to communicate to the application (312) the available events (or events of interest) related to the application (312) through an event/metadata API. The application (312) can be configured to process the available events (e.g., MPD events, inband events, or timed metadata events) and subscribe to particular events or timed metadata by notifying the synchronizer/dispatcher (308). Any events stored in the event and timed metadata buffer (306) that are not related to the application (312), but are instead related to the DASH client itself can be forwarded by the synchronizer/dispatcher (308) to the DASH logic (311) for further processing.

In response to the application (312) subscribing to particular events, the synchronizer/dispatcher (308) can communicate to the application (312) event instances (or timed metadata samples) corresponding to event schemes to which the application (312) has subscribed. The event instances can be communicated in accordance with a dispatch mode indicated by the subscription request (e.g., for a specific event scheme) or a default dispatch mode. For example, in an on-receive dispatch mode, event instances may be sent to the application (312) upon receipt in the event and timed metadata buffer (306). On the other hand, in an on-start dispatch mode, event instances may be sent to the application (312) at their associated presentation time, for example in synchronization with timing signals from the media decoder (309).

It is noted that, in the DASH client architecture, the thick dataflow lines indicate media dataflow, the narrow dataflow lines indicate even and timed metadata dataflow, and the dash dataflow lines indicates control and synchronization. In addition, the same processing model can be used for CMAF events.

III. URL Modification Based on a Local SBD

In the DASH standard, a general usage of an SBD file or document is provided. For example, the SBD file can be used to generate a URL query for a request URL. The request URL can be generated by a DASH access client and/or modified by an SBD client. In some cases, the URL query generation needs service information of one or more services of a device that the DASH access client and/or the SBD client runs on. For example, the service information of the device can be user identification (ID) information, device ID information, device hardware information, software information, operating system information, and/or application program information of the device. However, the DASH standard does not provide a method for the URL query generation based on the service information of the service(s) running on the device.

This disclosure includes methods of generating a URL query based on service information of service(s) of a device. The methods are based on session-based DASH operation. The service information of the service(s) can be gathered and updated dynamically.

Figure 4:
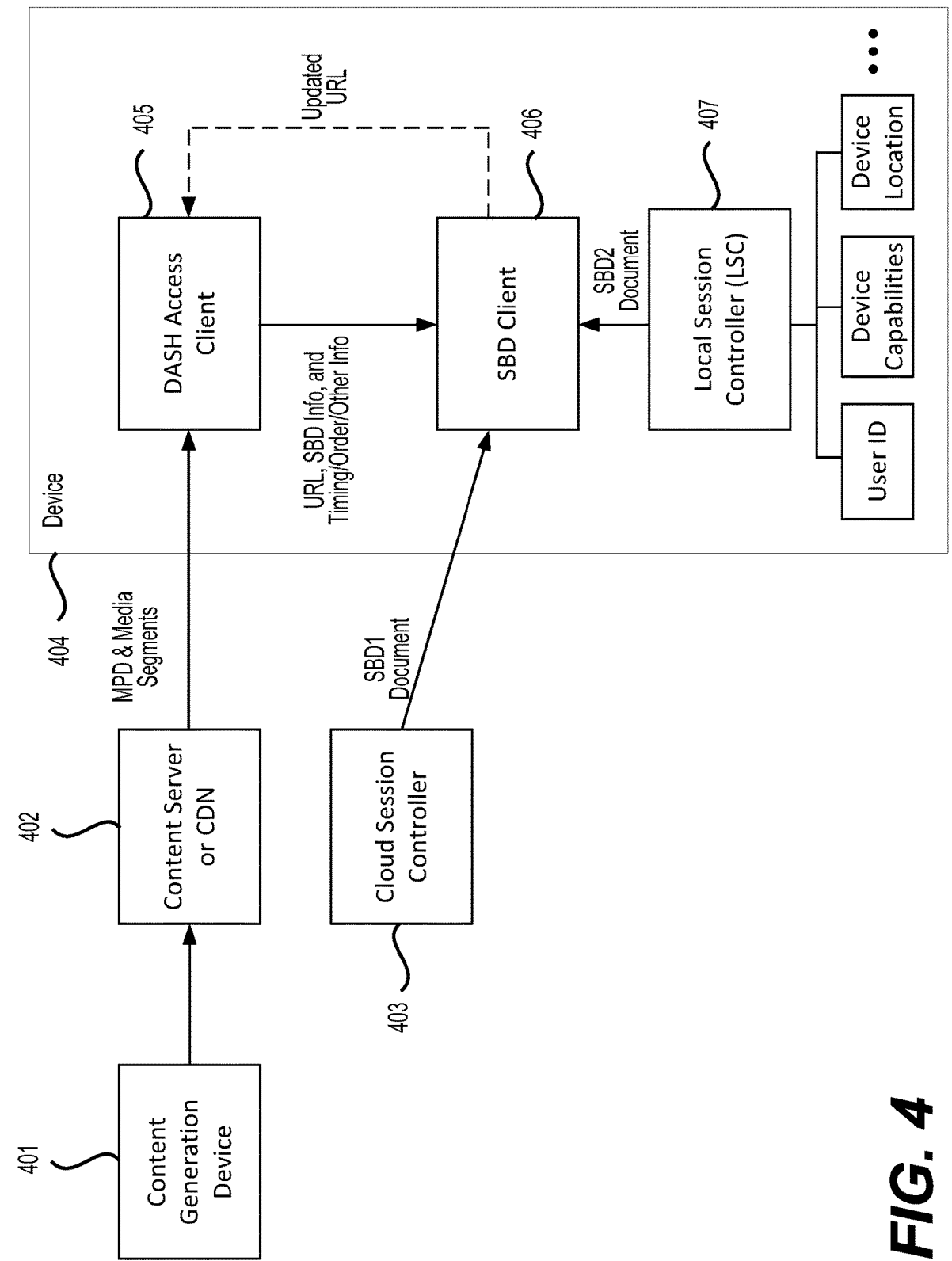
FIG. 4 shows an exemplary session-based DASH system according to an embodiment of the disclosure.

FIG. 4 shows an exemplary session-based DASH system according to an embodiment of the disclosure. In FIG. 4, a DASH access client (405) running on a device (404) can access a manifest file such as an MPD file and media segments through a CDN (402). In order to request a resource such as a media segment from the CDN (402), the DASH access client (405) can provide a request URL and an SBD URL (and associated information) to an SBD client (406), which also runs on the device (404). The SBD client (406) can download an SBD file based on the SBD URL and modify the request URL based on the SBD file. Then, the modified request URL can be returned to the DASH access client (405), which sends the modified request URL to the CDN (402) to request the resource.

In an embodiment, the SBD file can be an SBD1 document, which is located and provided by an external device or server such as a cloud session controller (CSC) (403). In this embodiment, the DASH access client (405) can provide an SBD URL pointing to a remote address in the CSC (403) for the SBD1 document. The SBD client (406) can download the SBD1 document from the CSC (403) based on the remote address in the CSC (403) and modify the request URL based on the SBD1 document.

In an embodiment, the SBD file can be an SBD2 document, which is located in a local cache of the device (404) and provided by a local session controller (LSC) (407) running on the device (404). In this embodiment, the DASH client (405) can provide an SBD URL pointing to a local address in the local cache for the SBD2 document. The SBD client (406) can access the SBD2 document through the LSC (407) based on the local address in the local cache and modify the request URL based on the SBD2 document.

In an embodiment, the request URL can be modified based on both the SBD1 and SBD2 documents. In this embodiment, the DASH access client (405) can provide two SBD URLs to the SBD client (406). One SBD URL is used to address the SBD1 document and the other one is used to address the SBD2 document. The SBD client (406) can access both SBD documents based on the SBD URLs and modify the request URL based on both SBD documents.

According to aspects of the disclosure, the LSC (407) can access information of different services, functions, and/or programs running on the device (404). For example, the LSC can access user ID information of the device (404), device ID information of the device (404), user ID information of an application program running on the device (404), application information of the application program (e.g., an application profile or an user profile), device capability information (e.g., device screen size or screen resolution) of the device (404), operating system information of the device (404) (e.g., operating system version), and/or device location information of the device (404). The information of the services, functions, and/or programs can vary from device to device and be accessed based a user permission. The SBD2 document can be generated and updated based on the information of the services, functions, and/or programs that run on the device (404).

In the DASH standard, an MPD file can include an essential property descriptor, referred to as an SBD essential property descriptor, to indicate an address of an SBD file. For example, a value of an attribute (e.g., @value) of the SBD essential property descriptor can be set as an SBD URL, based on which the SBD client (406) can access an SBD file.

In an embodiment, the SBD2 document can be located in a local cache of the device (404). In order to access the SBD2 document, the value of the attribute @value in the SBD essential property descriptor can be set as a local URL address, such as 'locolhost/SBD2.js' or '127.0.0.1/session-based/SBD2.js'.

The SBD2 document can include one or more key-value pairs. Each key of the one or more key-value pairs can indicate a different device or user characteristic. Examples of the keys can include different aspects of device hardware information (e.g., memory size or memory type), device firmware information (e.g. firmware version), device software information (e.g., media player version), operating system information (e.g., operating system version), device capabilities (e.g., device screen size or screen resolution), user partial or full information depending on a user permission, application information of application program(s) running on the device (404), and/or device location information of the device (404).

Depending on the nature of the information, a corresponding key-value pair can be either static or dynamic. A static key-value pair is a constant key-value pair, such as a key-value pair corresponding to the device screen size information. A dynamic key-value pair can be updated based on a change of the corresponding information, such as a key-value pair corresponding to the device location information.

In an embodiment, a key-value pair can be generated once, for each MPD, for each period, or with each request URL (e.g., a media segment request). A key-value pair can be generated and updated based on an event. For example, a key-value pair corresponding to the device location information can be updated whenever the location of the device (404) changes.

In an embodiment, a frequency of updating the key-value pair(s) in the SBD2 document can be managed by the LSC (407).

Table 1 shows exemplary settings for a key-value object in the SBD2 document according to an embodiment of the disclosure. In Table 1, a type of the SBD2 document can be set as a dynamic type, indicating that the key-value pair(s) in the SBD2 document can be updated every ttl seconds. A timeline model instead of an orderline model can be used for an arrangement of the key-value pairs in the SBD2 document, indicating the key-value pairs in the SBD2 document are time-based arranged. A loop attribute of the SBD2 document can be set as 'true', indicating that after running out of all timeline elements, a new set of timeline element(s) can be added by repeating the same element(s) until the session ends.

TABLE 1

| Element or Attribute Name Key Value | Use | Settings |
| --- | --- | --- |
| keylist | array of strings) | list of unique key names set by the application. Each key represents one aspect of device/user/session/local information. |
| comment | O (string) | optional |
| timescale | OD (integer) Default: 1 | Not needed as a single entry is created. |
| type | OD (string) | "dynamic" The SBD document and its value may be updated every ttl seconds. |
| ttl | CM (integer) | A value smaller than the minimum segment duration. |
| starttime | O (integer) | Not needed or set depending on the application |
| duration | O (integer) | Not needed |
| loop | OD (boolean) Default: 'false' | "true" |
| Timeline | array of objects | One timeline object |
| Orderline | array of objects | Not needed |

Table 2 shows exemplary settings for the timeline model of the SBD2 document according to an embodiment of the disclosure. In Table 2, an attribute @n is set as 0, indicating the starting (sub)segment is the first (sub)segment in the corresponding MPD or period element. An attribute @d is a duration of the timeline model and can be set as a very large value.

TABLE 2

| Element or Attribute Name | Use | Settings |
| --- | --- | --- |
| v | CM (array of string) | One v element. The keys are defined by the application. |
| s | CM (integer) | Not needed |
| n | CM (integer) | 0 |
| r | CM (integer) Default: 0 | Not needed |
| d | CM (integer) | A very large value. |

With the above settings, for each request sent from the DASH access client (405), the SBD client (406) can access the LSC (407) to get an updated SBD2 document. The LSC (407) can make inquiries to each module, function, program, and/or service running on the device (404) and then update the corresponding key-value pair(s) in the SBD2 document. Then, the LSC (407) can provide the updated SBD2 document to the SBD Client (406). Based on the updated SBD2 document, the SBD client (406) can modify a URL provided by the DASH access client (405) and send the modified URL back to the DASH access client (405). The DASH access client (405) can send the modified URL to the CDN (402) to request a resource.

In an embodiment, the MPD and manifest information can be provided to the LSC (407). For example, the LSC (407) can have the latest MPD and manifest information such as MPD URL information, MPD query information, MPD publish time information, period ID information, adaptation set ID information, and/or representation set ID information. Other information, such as specific information in various descriptors included in the MPD file can also be provided to the LSC (407) if needed. The LSC (407) can set the information as various keys in the SBD2 document. Therefore, the MPD and manifest information can be added as a part of a URL query to request a resource from the CDN (402).

In an embodiment, for the URL provided by the DASH access client (405), the SBD client (406) can modify the URL by adding one or more key-value pairs in the SBD2 document to a URL query of the URL. The one or more key-value pairs can be determined based on a time range corresponding to a media segment that the URL requests. Each of the one or more key-value pairs can correspond to information of a different service running on the device (404). For example, a first key-value pair can correspond to a first service including the device screen size information and a second key-value pair can correspond to a second service including the device screen resolution information. If the device (404) has a screen size of 21 inches and a screen resolution of 1600×1200, the first key-value pair can be set as 'screen_size=21inches' and the second key-value pair can be set as 'screen_resolution=1600×1200'. These two key-value pairs can be combined as 'screen_size=21inches& screen_resolution=1600×1200', which can be added as the URL query.

In an embodiment, for the URL provided by the DASH access client (405), the SBD client (406) can modify the URL by customizing one or more URL parts of the URL based on the SBD2 document. For example, one or more of a host part, a port part, a path part, and/or a fragment part of the URL can be customized by the SBD client (406) based on the key-value pair(s) in the SBD2 document.

In an embodiment, the URL used to request a resource from the CDN (402) can be one of a media segment request, an MPD request, an Xlink resolution request, a callback request that is triggered by a callback event, a chaining request for a chained-to MPD, or a fallback request for a fallback MPD.

This disclosure includes a method for adding one or more of various device, user, application, and/or streaming session parameters dynamically as a query to a request URL such as a media segment request URL. These parameters can be generated by an LSC such as the LSC (407) and be included in different services running on a device such as the device (404). The LSC can access these parameters by accessing the services including these parameters. Based on these parameters, the LSC can generate a dynamic SBD document (e.g., SBD2) including key-value pair(s) with each corresponding to one different parameter. The dynamic SBD document can be stored as a resource in a local cache of the device. The SBD document can be set up with a configuration that indicates it is dynamic and be updated with any change of the parameters. The SBD document can be accessed with every request received from an SBD client such as the SBD client (406). The SBD client can send a request to the LSC to access the SBD document, for example, when the URL query information is to be updated. An address value of the SBD document in the local cache can be included in an SBD essential property descriptor in an MPD file so that the SBD client can access the SBD document.

In an embodiment, a DASH access client such as the DASH access client (405) can send a key name and a time range to the SBD client. The SBD client can access the SBD document to determine a value corresponding to the key name and the time range. Then, the SBD client or the DASH access client can modify the URL based on the value, for example by adding the value as a URL query of the URL. If the DASH client sends the URL to the SBD client, the SBD client can modify the URL and return the modified URL to the DASH access client. Otherwise, the SBD client can return the value to the DASH access client, which then modifies the URL based on the value. In either way, the modified URL can be sent by the DASH access client to a remote server such as the CDN (402) to request a resource.

This disclosure includes a method of customizing one or more parts of a URL based on a dynamic SBD document (e.g., SBD2) stored in a local cache of a device such as the device (404). The one or more parts can include a host part, a port part, a path part, and/or a fragment part of the URL. The dynamic SBD document is generated by an LSC such as the LSC (407) and includes key-value pair(s) with each corresponding to service information of a different service running on the device.

This disclosure includes a method of acquiring a resource from a remote server based on a modified URL. The modification of the URL can be a URL query addition and/or a URL part(s) customization. The modified URL can be one of an MPD update request, an Xlink resolution request, a callback request, a chaining MPD request, or an MPD fallback request. Based on a type of the request of the modified URL, a corresponding resource can be acquired from the remote server such as the CDN (402).

IV. Flowchart

Figure 5:
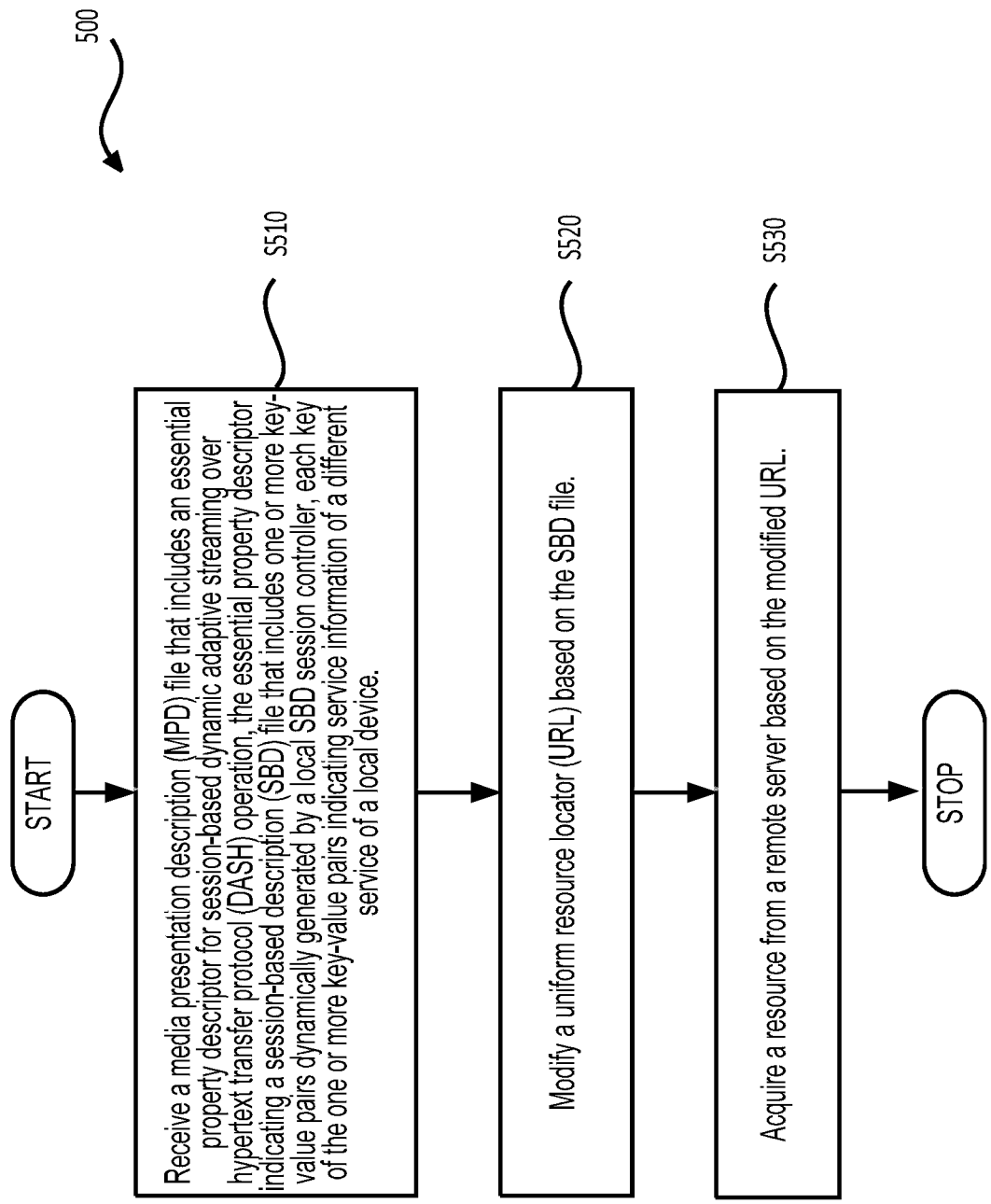
FIG. 5 shows a flow chart outlining a process example in accordance with some embodiments.

FIG. 5 shows a flow chart outlining a process (500) according to an embodiment of the disclosure. In various embodiments, the process (500) is executed by processing circuitry, such as the processing circuitry in the DASH client (102). In some embodiments, the process (500) is implemented in software instructions, thus when the processing circuitry executes the software instructions, the processing circuitry performs the process (500).

The process (500) starts at (S510), where the process (500) receives an MPD file that includes an essential property descriptor for session-based DASH operation. The essential property descriptor indicates an SBD file that includes one or more key-value pairs dynamically generated by a local SBD session controller. Each key of the one or more key-value pairs indicates service information of a different service of a local device. Then, the process (500) proceeds to step (S520).

At step (S520), the process (500) modifies a URL based on the SBD file. Then, the process (500) proceeds to step (S530).

At step (S530), the process (500) acquires a resource from a remote server based on the modified URL. Then, the process (500) terminates.

In an embodiment, the essential property descriptor includes a local address of the SBD file.

In an embodiment, the service information includes at least one of device information, user information, application information, or location information.

In an embodiment, in response to a change in the service information of the local device, the process (500) updates one of the one or more key-value pairs corresponding to the service information of one of the services of the local device.

In an embodiment, the process (500) modifies at least one of a host part, a port part, a path part, or a fragment part of the URL based on the SBD file.

In an embodiment, the process (500) adds a query to the URL based on the SBD file.

In an embodiment, the URL is one of a media segment request, an MPD request, an XLink resolution request, a callback request that is triggered by a callback event, a chaining request for a chained-to MPD, or a fallback request for a fallback MPD.

In an embodiment, a type of the SBD file is a dynamic type and the one or more key-value pairs are arranged in a time-based order.

V. Computer System

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
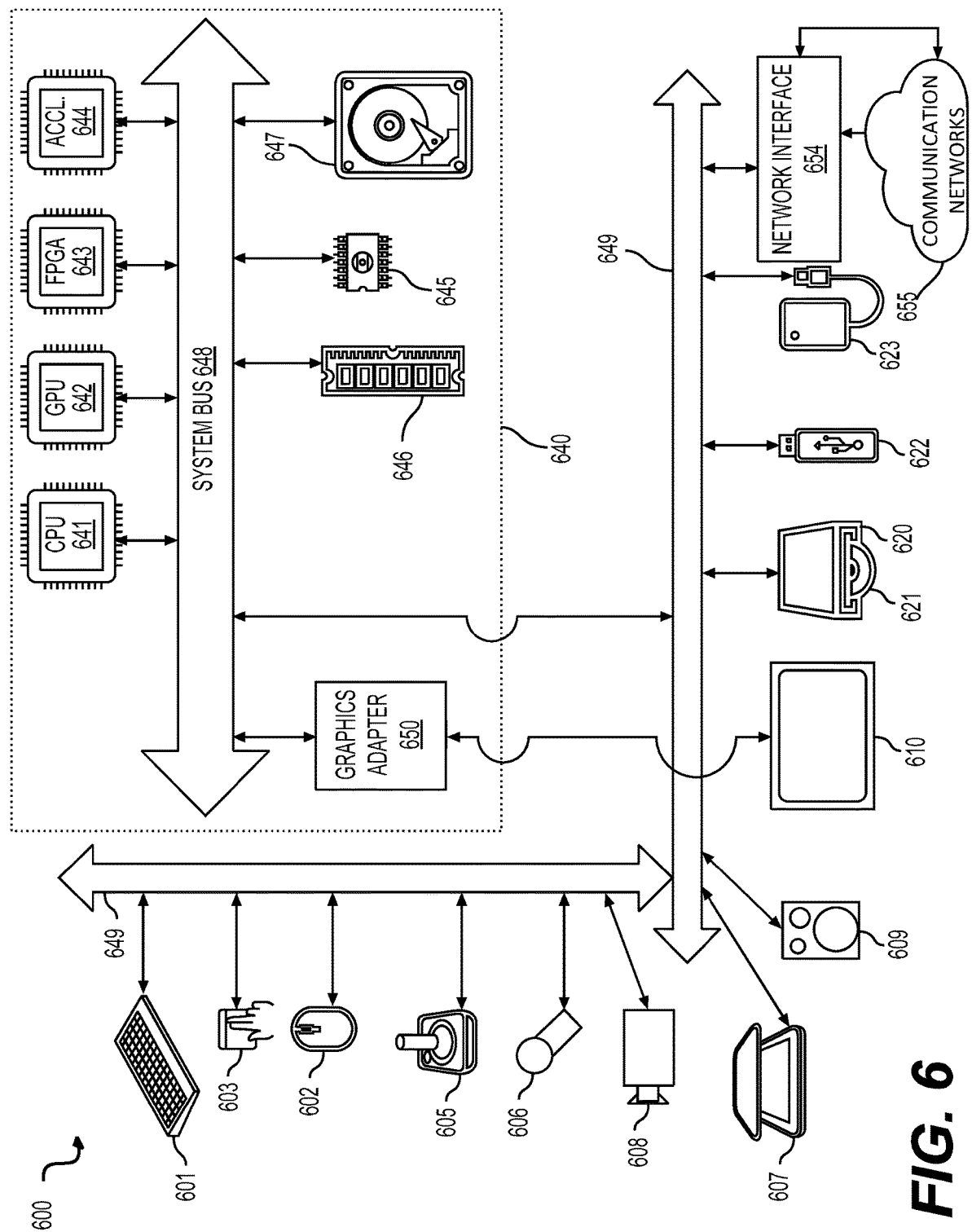
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (610)) can be connected to a system bus (648) through a graphics adapter (650).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include a network interface (654) to one or more communication networks (655). The one or more communication networks (655) can for example be wireless, wireline, optical. The one or more communication networks (655) can further be local, wide-area, metropolitan, vehicular and industrial, real-time, delay-tolerant, and so on. Examples of the one or more communication networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through the system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600) and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of receiving media data, comprising:
    receiving a media presentation description (MPD) file that includes an essential property descriptor for session-based dynamic adaptive streaming over hypertext transfer protocol (DASH) operation, the essential property descriptor indicating an address of a session-based description (SBD) file, the SBD file including one or more key-value pairs dynamically generated by a local SBD session controller, each key of the one or more key-value pairs indicating service information of a different service of a local device;
    obtaining the SBD file based on the address of the SBD file indicated by the essential property descriptor;
    modifying a uniform resource locator (URL) based on the obtained SBD file; and
    acquiring a resource from a remote server based on the modified URL.

2. The method of claim 1, wherein the address is included in the essential property descriptor and is a local address of the SBD file.

3. The method of claim 1, wherein the service information includes at least one of device information, user information, application information, or location information.

4. The method of claim 1, further comprising:
    in response to a change in the service information of the local device,
        updating one of the one or more key-value pairs corresponding to the service information of one of the services of the local device.

5. The method of claim 1, wherein the modifying includes modifying at least one of a host part, a port part, a path part, or a fragment part of the URL based on the SBD file.

6. The method of claim 1, wherein the modifying includes adding a query to the URL based on the SBD file.

7. The method of claim 1, wherein the URL is one of a media segment request, an MPD request, an extensible markup language linking language (XLink) resolution request, a callback request that is triggered by a callback event, a chaining request for a chained-to MPD, or a fallback request for a fallback MPD.

8. The method of claim 1, wherein a type of the SBD file is a dynamic type and the one or more key-value pairs are arranged in a time-based order.

9. An apparatus for receiving media data, the apparatus comprising:
    processing circuitry configured to:
        receive a media presentation description (MPD) file that includes an essential property descriptor for session-based dynamic adaptive streaming over hypertext transfer protocol (DASH) operation, the essential property descriptor indicating an address of a session-based description (SBD) file, the SBD file including one or more key-value pairs dynamically generated by a local SBD session controller, each key of the one or more key-value pairs indicating service information of a different service of a local device;
        obtain the SBD file based on the address of the SBD file indicated by the essential property descriptor;
        modify a uniform resource locator (URL) based on the obtained SBD file; and
        acquire a resource from a remote server based on the modified URL.

10. The apparatus of claim 9, wherein the address is included in the essential property descriptor and is a local address of the SBD file.

11. The apparatus of claim 9, wherein the service information includes at least one of device information, user information, application information, or location information.

12. The apparatus of claim 9, wherein the processing circuitry is further configured to:
  in response to a change in the service information of the local device,
    update one of the one or more key-value pairs corresponding to the service information of one of the services of the local device.

13. The apparatus of claim 9, wherein the processing circuitry is further configured to:
  modify at least one of a host part, a port part, a path part, or a fragment part of the URL based on the SBD file.

14. The apparatus of claim 9, wherein the processing circuitry is further configured to:
  add a query to the URL based on the SBD file.

15. The apparatus of claim 9, wherein the URL is one of a media segment request, an MPD request, an extensible markup language linking language (XLink) resolution request, a callback request that is triggered by a callback event, a chaining request for a chained-to MPD, or a fallback request for a fallback MPD.

16. The apparatus of claim 9, wherein a type of the SBD file is a dynamic type and the one or more key-value pairs are arranged in a time-based order.

17. A non-transitory computer-readable storage medium storing instructions which, when executed by a computer for receiving media data, cause the computer to perform:
  receiving a media presentation description (MPD) file that includes an essential property descriptor for session-based dynamic adaptive streaming over hypertext transfer protocol (DASH) operation, the essential property descriptor indicating an address of a session-based description (SBD) file, the SBD file including one or more key-value pairs dynamically generated by a local SBD session controller, each key of the one or more key-value pairs indicating service information of a different service of a local device;
  obtaining the SBD file based on the address of the SBD file indicated by the essential property descriptor;
  modifying a uniform resource locator (URL) based on the obtained SBD file; and
  acquiring a resource from a remote server based on the modified URL.

18. The non-transitory computer-readable storage medium of claim 17, wherein the address is included in the essential property descriptor and is a local address of the SBD file.

19. The non-transitory computer-readable storage medium of claim 17,
  wherein the service information includes at least one of device information, user information, application information, or location information.

20. The non-transitory computer-readable storage medium of claim 17, wherein the stored instructions cause the computer to perform:
  in response to a change in the service information of the local device,
    updating one of the one or more key-value pairs corresponding to the service information of one of the services of the local device.

* * * * *